United States Patent [19]

Kerr

[11] Patent Number: 4,920,587
[45] Date of Patent: May 1, 1990

[54] BEDSIDE TOILET

[76] Inventor: Harry D. Kerr, 4641 North Ardmore Ave., Whitefish Bay, Wis. 53211

[21] Appl. No.: 281,183

[22] Filed: Dec. 7, 1988

[51] Int. Cl.$^5$ ............................................. A61G 7/02
[52] U.S. Cl. .......................................... 4/480; 4/460; 4/483; 5/68; 5/81 B; 5/90
[58] Field of Search ........................... 4/460, 478–484; 5/64, 68, 81 R, 81 B, 90; 414/921; 224/158, 159

[56] References Cited

U.S. PATENT DOCUMENTS

| | | | |
|---|---|---|---|
| 2,500,544 | 3/1950 | Haskins . | |
| 2,869,614 | 1/1959 | Wamsley | 4/480 X |
| 3,050,741 | 8/1962 | Coleman . | |
| 3,261,031 | 7/1966 | Gates | 4/480 X |
| 3,452,371 | 7/1969 | Hirsch | 5/81 B |
| 3,729,749 | 5/1973 | Rosecrams . | |
| 3,875,599 | 4/1975 | Mracek et al. | 5/348 R |
| 3,902,204 | 9/1975 | Lee | 5/81 B |
| 4,019,772 | 4/1977 | Lee | 296/20 |
| 4,278,387 | 9/1981 | Seguela et al. | 414/462 |
| 4,334,330 | 1/1982 | Marshall | 4/480 |
| 4,571,759 | 2/1986 | Sasaki | 5/90 |
| 4,631,761 | 12/1986 | Lederman | 5/81 R |
| 4,794,655 | 1/1989 | Ooka et al. | 5/81 R |

FOREIGN PATENT DOCUMENTS

| | | | |
|---|---|---|---|
| 2017014 | 10/1979 | United Kingdom . | |
| 001313 | 4/1982 | World Int. Prop. O. | 414/921 |

OTHER PUBLICATIONS

Patrick A. Finlay, "Medical Robotics—Why, What and When", Mar. 1989.

Primary Examiner—Henry J. Recla
Assistant Examiner—R. M. Fetsuga
Attorney, Agent, or Firm—Andrus, Sceales, Starke & Sawall

[57] ABSTRACT

A bedside toilet apparatus including an elongated platform to support a patient. The platform includes a posterior section, a back section and a leg section which are hinged together so that the platform can be moved from a generally horizontal condition to an operable position in which the back section extends upwardly from the posterior section and the leg section extends downwardly. The posterior section includes a toilet. The platform is supported in cantilevered relation by a pair of arms each of which extends outwardly from a housing. A first drive mechanism in the housing operates to raise and lower the arms to thereby move the platform vertically, while a second drive mechanism moves the housings in unison to position the platform over a bed. After the patient is on the platform and the platform is moved away from the bed, a third drive mechanism operates to move the platform from the horizontal to the operating position where the patient is in a normal position for bowel movement. The toilet includes a seat on the posterior section and a tray is mounted for movement beneath the posterior section and contains a removable bag which receives the fecal material.

21 Claims, 3 Drawing Sheets

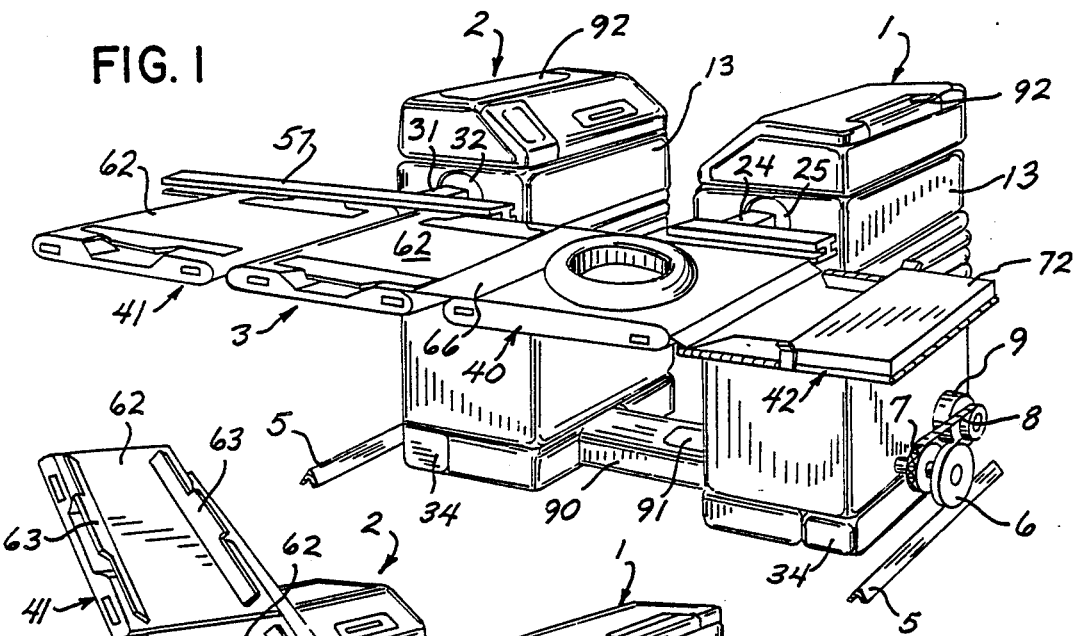
FIG. 1
FIG. 2
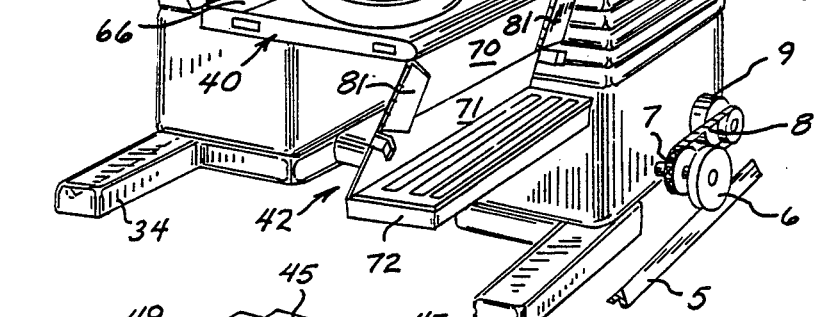
FIG. 7
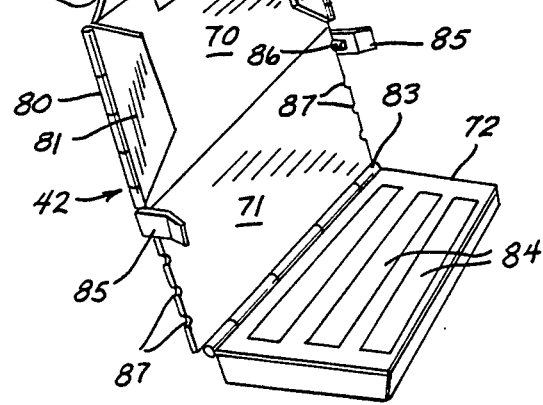
FIG. 8
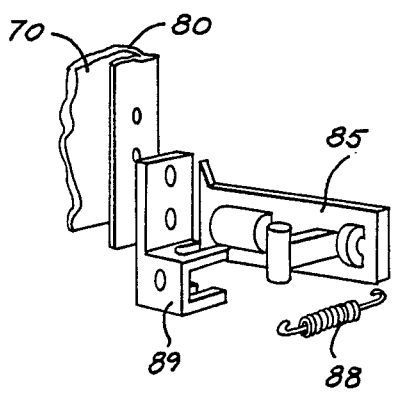

BEDSIDE TOILET

BACKGROUND OF THE INVENTION

Most bedridden patients require assistance in having a bowel movement and the bedridden patient, whether in the hospital, a nursing home or home, commonly experiences an assault on his dignity as well as a loss of privacy during the operation.

The most common method of managing a bowel movement is through use of a bed pan. The bed pan is positioned on the bed and assistance is usually required in getting the patient properly positioned on the bed pan. The patient normally holds onto the side rails of the bed and stretches his legs outwardly when positioned on the bed pan. Balance is difficult, and the sitting position employed with a bed pan compresses the buttocks interfering with the usual anal muscle function.

If assistants are present, the patient can be helped or lifted from the bed and positioned on a bedside commode. This requires considerable assistance in moving the patient from the bed to the commode and returning the patient to the bed. In place of manual assistance, canvas slings are frequently used with hydraulic lifts and davits to raise the patient out of the bed, swing the patient through the air and lower the patient onto the bedside commode. However, this process requires a substantial period of time, generally from 5–10 minutes and may not be fast enough to prevent soiling of the bed, the sling or other equipment.

SUMMARY OF THE INVENTION

The invention is directed to a portable bedside toilet that enables a patient to be readily transferred from a bed to the toilet without a heavy labor expenditure and permits the patient to be positioned in a normal and comfortable position for a bowel movement.

The bedside toilet of the invention includes an elongated platform to support a patient and composed of a posterior section, a back section and a leg section which are hinged together and movable between a horizontal condition and a operative condition where the back section extends upwardly from the posterior and the leg section extends downwardly.

A toilet is associated with the posterior section and includes a seat that is mounted on the upper surface of the posterior section. A tray is mounted for sliding movement beneath the posterior section and carries a receptacle such as a plastic bag, which receives the fecal material. After the bowel movement, the bag can be sealed and discarded.

The platform which supports the patient is carried in cantilevered fashion by a pair of arms that are connected to the back section and posterior section, respectively, and extend outwardly from a pair of housings or towers. A first drive mechanism contained within the housings serves to raise and lower the supporting arms in unison to thereby raise and lower the platform.

A second drive mechanism operates to move the housings and platform over the ground or supporting structure to position the platform over the bed and return the platform to a position removed from the bed.

A third drive mechanism serves to pivot the back section relative to the posterior section and to pivot the leg section downwardly so that the patient will be in a normal and comfortable sitting position for the bowel movement.

In operation, the platform in a horizontal position is initially moved laterally to a position over the bed and then lowered so that the platform is on the bed next to the patient. The patient is then rolled onto the platform, the platform is elevated slightly above the bed and moved laterally to a position removed from the bed.

The platform is then moved to the operating condition where the back extends upwardly from the posterior section and the leg section extends downwardly so that the patient is then in a comfortable and proper position for the bowel movement.

After completion of the bowel movement, the receptacle containing the fecal material is sealed and removed.

The construction also includes a pair of outriggers that are mounted for sliding movement with respect to each of the housings. The outriggers can be moved from a storage position within the respective housing to a supporting position where they are located beneath the platform to prevent possible tilting of the housings due to the weight of the patient on the cantilevered platform.

The bedside toilet construction of the invention provides a mechanism for readily transferring a bedridden patient from the bed to the toilet without the need for a heavy labor expenditure. The invention can be used in hospitals, nursing homes or private homes.

As both the back section and leg section are pivoted relative to the posterior section, the patient is in a normal comfortable position for the bowel movement.

Since the toilet is mounted on the platform, it is in a position to contain the incontinence even if the patient is not completely withdrawn from the bed.

As the housings or towers are separated, an attendant can stand between the towers in position to aid the patient.

Other objects and advantages will appear in the course of the following description.

IN THE DRAWINGS

FIG. 1 is a perspective view of the apparatus of the invention with the platform shown in the horizontal condition;

FIG. 2 is a view similar to FIG. 1 showing the platform in the operating condition;

FIG. 7 is a perspective view of the posterior and leg sections of the platform; and FIG. 8 is an exploded perspective view of the locking mechanism for the leg section of the platform.

DESCRIPTION OF THE ILLUSTRATED EMBODIMENT

Figure 3:
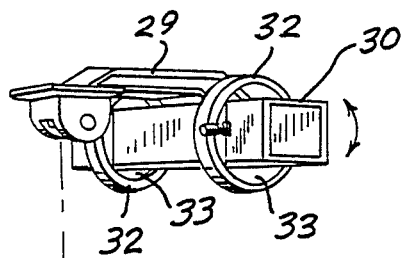
FIG. 3 is a perspective and exploded view showing the drive mechanisms contained within the housings.

The drawings illustrate a bedside toilet construction comprising a pair of interconnected housings 1 and 2 and a platform 3 to support a patient. Platform 3 is mounted in cantilevered relation from the housings 1 and 2.

Housings 1 and 2 are mounted for movement in a direction toward and away from a bed, and in this regard, a pair of tracks 5 are mounted on the floor or foundation and one end of each track is attached to the bed. A drive wheel 6 is mounted on a common shaft with a sprocket 7 that is journalled with respect to housing 1, and sprocket 7 is connected by chain drive 8 to the drive shaft of a motor 9. The drive mechanism can be contained in a housing, not shown, that extends outwardly from the side of housing 1. Drive wheel 6 rides on one of the guide tracks 5, while an idler wheel, not shown, journalled on the side of housing 2 rides on the other guide track. With this construction, operation of motor 9 will drive wheel 6 to move the housings 1 and 2 in unison on tracks 5 toward and away from the bed.

To aid in supporting the weight of the housings 1 and 2, a pair of casters 10 are mounted for universal movement on the lower surface of each housing, as shown in FIG. 3, and ride on the floor as the housings 1 and 2 are moved toward and away from the bed.

The construction of housings 1 and 2 is best illustrated in FIG. 3. Each housing includes a generally box-like frame 11 and a movable frame section 12 which is mounted for sliding movement on the frame 11. An outer casing or jacket 13, not shown in FIG. 3, encloses the frame sections 11 and 12.

Frame 11 is composed of four vertical columns 15 which are located at the corners of frame 11 and the lower and upper ends of the columns 15 are connected by horizontal braces 16.

The sliding frame section 12 includes four tubular slides 17 which are mounted for sliding movement on columns 15. Slides 17 are connected by a group of horizontal braces 18, and a generally X-shaped framework 19 extends upwardly from the slides 17 and supports an upper shelf or platform 20.

To move the sliding frame section 12 relative to the frame 11, a fluid cylinder 21 is mounted on the lower end of frame 11 and a piston rod 22 which extends upwardly from cylinder 21 is pivotally connected to a horizontal plate 23 which is attached to the undersurface of platform 20. Extending and retracting piston rod 22 will cause the sliding frame section 12 to raise and lower relative to the frame 11.

The sliding frame section 12 of housing 1 carries a beam 24 which rests on platform 20 and projects outwardly from the housing and is attached to platform 3. Beam 24 extends through a vertical slot 25 in the outer jacket or casing 13.

Housing 2 also includes a second fluid cylinder unit 26. The lower end of cylinder 26 is pivotally mounted to brackets 27 which are connected to the sliding frame section 12. Piston rod 28 which extends upwardly from cylinder 26 is pivotally connected to an arm 29 that extends laterally from beam 30. Beam 30, which is similar to beam 24, projects outwardly from housing 2 through a vertical slot 31 in outer jacket 13 and is also connected to platform 3, as will be hereinafter described.

Operation of the second cylinder 26 will act to rotate beam 30 about its axis and, in this regard, beam 30 is rotatably supported by a pair of rings 32 that are mounted on the platform 20. Bearings 33 journal the beam 30 for rotation within the rings 32. Thus, as the cylinder 26 is extended and retracted, beam 30 will be rotated within the rings 32 to thereby cause pivotal movement of a back section of the platform 3 as will be hereinafter described.

Beams 24 and 30 extend outwardly from housings 1 and 2 and support the platform in a cantilevered relation. To provide added stability for housings 1 and 2, outriggers 34 are associated with the lower end of the housings 1. Each outrigger 34 is in the form of an elongated beam and the upper surface of each outrigger carries an generally T-shaped guide rail 35 which slides within a guideway 36 on the lower surface of the respective housing. Outriggers 34 can be moved manually from a storage position where they are located within the confines of housings 1 and 2 to a supporting position where the outriggers project outwardly from the housings and are located beneath the platform 3. The outriggers are located in close proximity to the floor and will prevent tilting of the housings if an excessive load is applied to platform 3.

Platform 3 is composed of a posterior section 40, a back section 41 and a leg section 42. The back section 41 and leg section 42 can be pivoted with respect to the posterior section 40 so that the platform can either be in a horizontal condition, as shown in FIG. 1, or a pivoted operative position as shown in FIG. 2.

Figure 5:
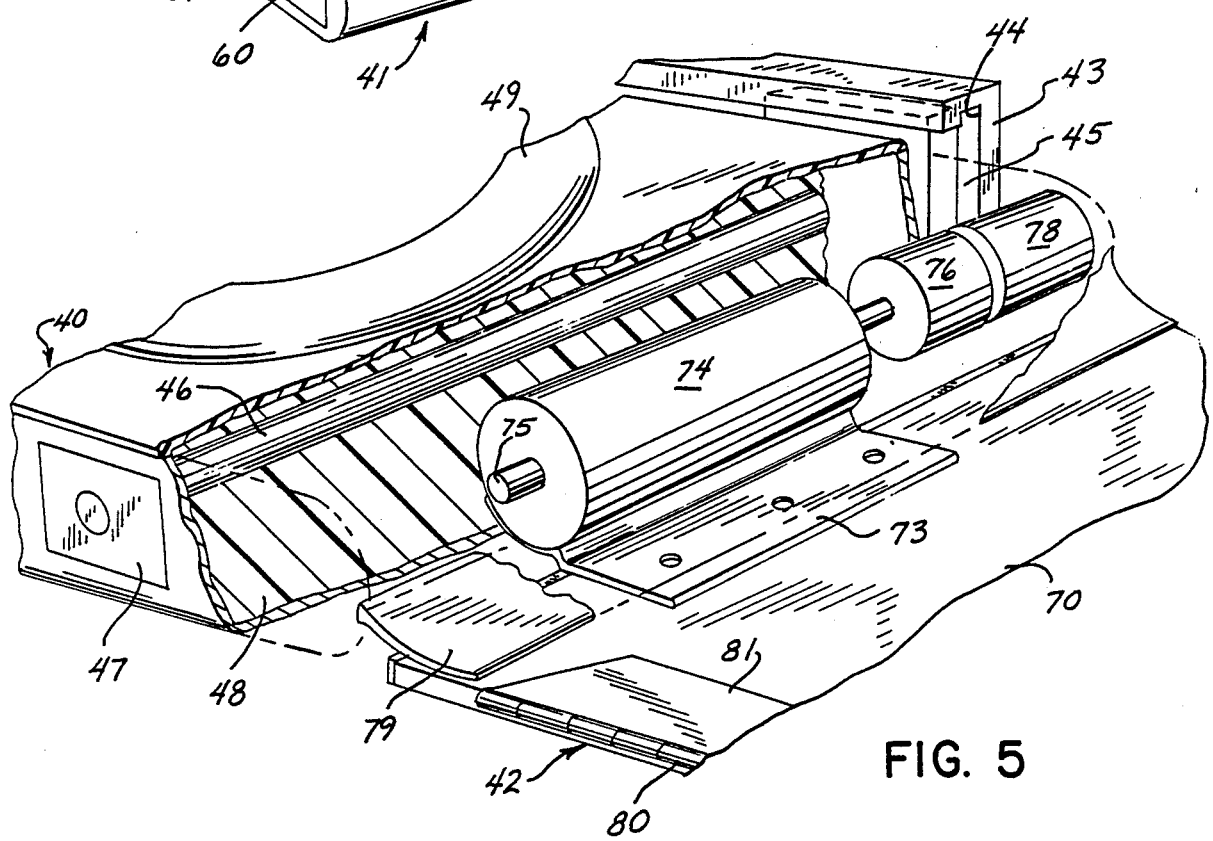
FIG. 5 is a perspective view with parts broken away in section showing the drive for pivoting the leg section of the platform.

As shown in FIG. 5, posterior section 40 includes a generally horizontal rail 43 that is attached to the outer end of beam 24 and rail 43 is provided with a horizontal guide track or slot 44 which receives a pair of slide blocks 45. A rod 46 is attached to each block 45 and extends outwardly from the respective block and the outer end of each rod 46 carries a second generally rectangular metal block 47.

Posterior section 40 also includes a padded cushion 48 which is supported by the rods 46.

A toilet is associated with the posterior section 40 of the platform and the toilet includes a generally annular seat 49, which is mounted on the cushion 48 and borders an opening 50 in the cushion. A tray 51 is mounted for sliding movement beneath opening 50 on a pair of spaced angle-shaped guides 52 that are secured to the undersurface of the cushion.

Figure 6:
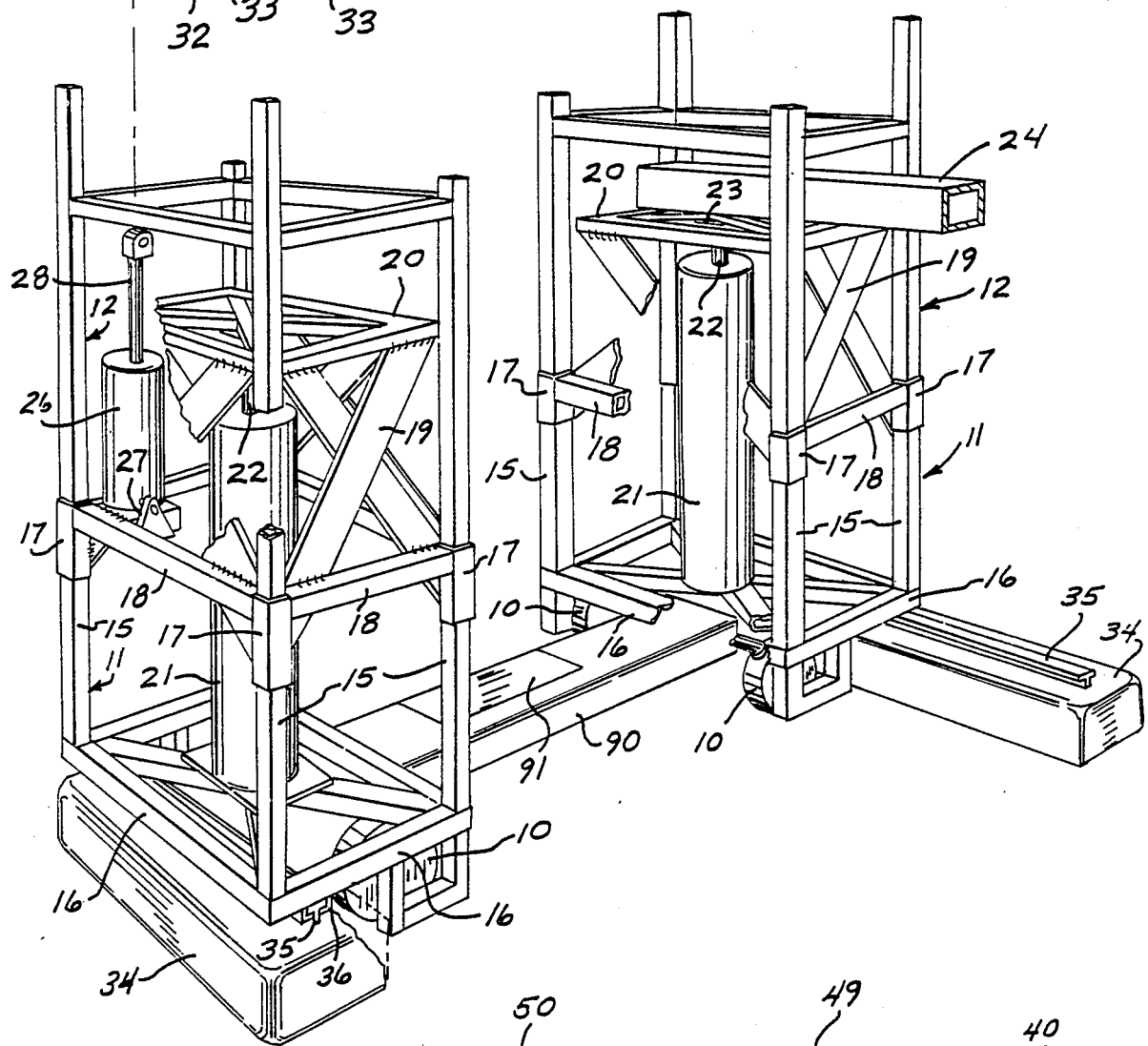
FIG. 6 is an enlarged vertical section of the posterior section showing the toilet.
Figure 6:
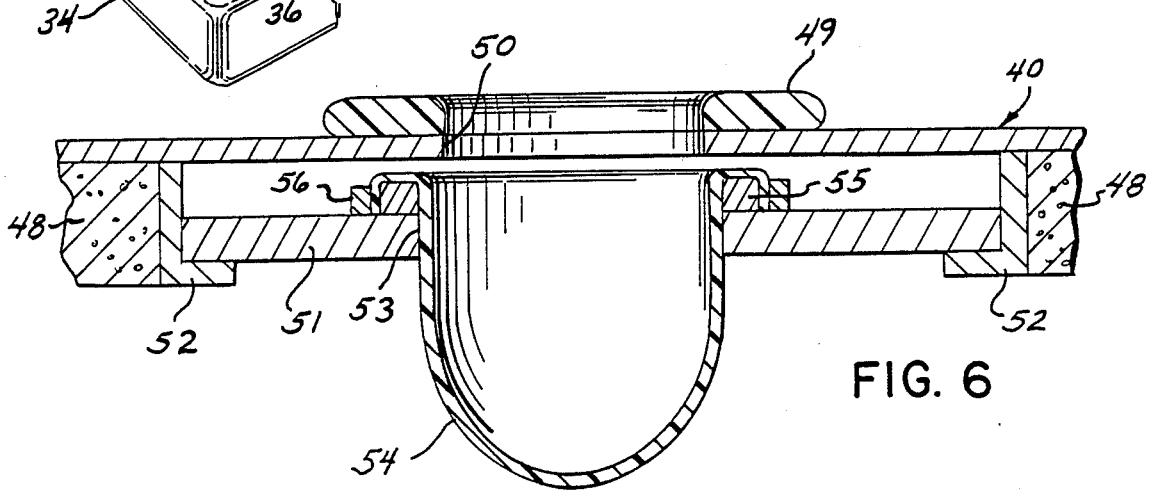

As shown in FIG. 6, tray 51 is provided with a central hole 53 and a disposable bag 54, formed of plastic or the like, is removably connected to rim 55, which borders hole 53, by a suitable clamping band 56. With this construction, the fecal material will be collected in bag 54, and the tray 51 and the attached bag can then be removed from the section 40, the clamping band 56 removed, and the bag can then be discarded and replaced with a fresh bag.

Figure 4:
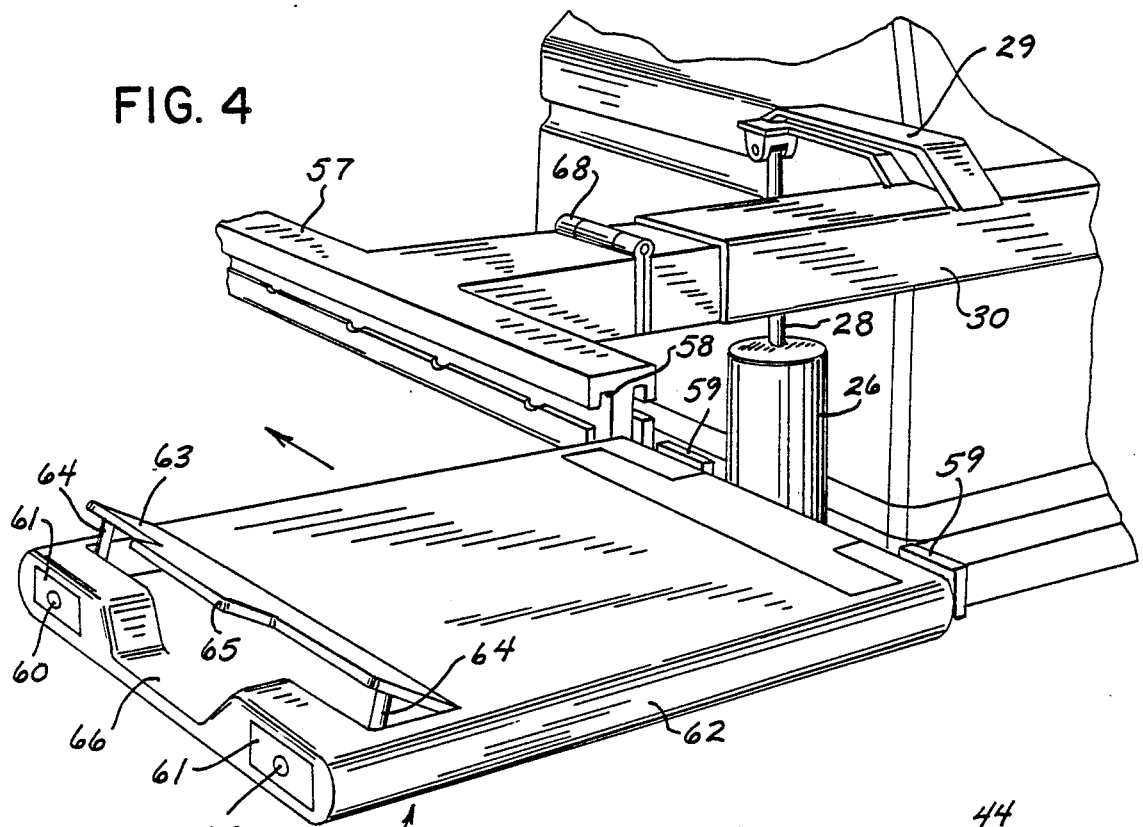
FIG. 4 is a perspective view showing the attachment of the back section of the platform to one of the arms.

As illustrated in FIG. 4, a rail 57 is attached to the outer end of beam 30, and rail 57 is formed with a longitudinal slot or guideway 58, which receives a pair of guide blocks 59 on back section 41. Rod 60 extends outwardly from each guide block 59 and the outer end of each rod carries a second metal, generally rectangular block 61. A padded cushion 62 is supported by the rod 60 and blocks 61. As shown in the drawings, back section 41 is composed of two cushions 62, but it is contemplated that a single elongated cushion could be used.

The outer edge of back section 41 is provided with a hinged flap 63. Flap 63 can be pivoted from a position where it is generally flush with the upper surface of cushion 63, as shown in FIG. 1, to an upward inclined position, as shown in FIGS. 2 and 4, where it will provide side support for a patient. The flap 63 can be held in the upward pivoted position by a pair of support arms 64 which are pivoted to the cushion 62 and when pivoted to the upright position service will support the flap 63 in the inclined supporting position.

Flap 63 is provided with a central projecting end portion 65, which is received within a recess 66 in the cushion 62, as shown in FIG. 4.

The patient, as will be hereinafter described, is initially positioned on the horizontal platform 3 and after the platform is moved to a location offset from bed 4, cylinder 26 is operated to rotate beam 30 and thereby pivot back section 41 upwardly, so that it is disposed at an angle to the horizontal posterior section 40. A flexible web 66 formed of fabric or plastic material interconnects the adjacent edges of the back section 41 and posterior section 40 to bridge the gap between the sections as the back section is pivoted upwardly to the location shown in FIG. 2.

For storage purposes it is contemplated that the beams 24 and 30 can be formed of a pair of end-to-end beam sections which are hinged together by a hinge 68. By utilizing the hinge connection, as shown in FIG. 4, the outer beam sections which are attached to platform 3 can be pivoted upwardly to decrease the required floor space for storage purposes.

Leg section 42 is hinged to posterior section 40 and is adapted to be pivoted from a position where it is flush with the posterior section 40, as shown in FIG. 1, to a downward position as shown in FIG. 2.

The leg section 42 includes an upper member 70, an intermediate member 71, which is slidable relative to upper member 70, and a lower footrest 72, that is hinged to the lower edge of the intermediate member 71.

To provide a hinged connection between upper member 70 and posterior section 40, one end of a strap-type hinge 73 is secured to the upper edge of upper member 70, as shown in FIG. 5, while the opposite end of hinge 73 is secured to the outer surface of a generally cylindrical drum 74 which is located within the cushion 48. Shaft 75 of drum 74 is connected through a gear reduction unit, indicated generally by 76, to the shaft of a motor 78. Through operation of motor 78, the drum will be rotated to thereby pivot the upper member 70 of the leg section 42 relative to the posterior section 40.

An elongated flexible gasket 79 made of rubber or plastic material is secured within a slot in cushion 48 and bridges the gap to the upper member 70 of the leg section. Gasket 79 serves to enclose a potential pinch point between the posterior section 40 and the upper member 70 of leg section 42.

Leg section 42 is adapted to be pivoted downwardly to a beyond vertical operating position where the included angle between the leg section and the posterior section is in the range of about 60° to 70°. This angular relationship between the leg section 42 and posterior section 40 provides the most comfortable position for the patient during a bowel movement.

In order to adjust the position of foot rest 72, intermediate member 71 is mounted for sliding movement with respect to upper member 70. In this regard the side edges of member 70 are provided with guideways 80 which receive the side edges of the intermediate member 71.

To provide side support for the patient's legs, a side panel 81 is hinged to each side edge of the upper member 70, as best illustrated in FIG. 7, by a hinge 80. In the storage position, the side panels 81 can be pivoted inwardly against the upper member 70, while in the operative position, the side panels will be pivoted outwardly, as shown in FIG. 2 to provide side support for the patient's legs.

The lower footrest 72 is hinged to the lower edge of intermediate member 71 by a hinge 83. In the storage position, the footrest will be disposed flatwise against the upper member 70 and in the operative position the footrest will be pivoted outwardly, so that it is generally horizontal or parallel to the floor to provide support for the patient's feet. Suitable treads 84 can be secured to the supporting surface of the footrest 72.

The intermediate member 71 is adapted to be telescoped or slid outwardly relative to the upper member 70 and locked in one of a number of positions to locate the footrest 72 at the proper position for the patient. In this regard, a spring clip 85 is secured to the lower end of each side edge of upper member 70 and each spring clip carries a pin 86, which is adapted to engage one of a series of spaced notches 87 in the respective side edges of the intermediate member 71, as shown in FIG. 8. By pulling the spring clips 85 manually outward, away from each other, pins 86 will be released from notches 87 to enable the intermediate member 71 to be moved relative to the upper member 70 to vary the height of the foot rest, as desired. Each spring clip is biased inwardly by a coil spring 88, which is connected between the outer end of the spring clip and a bracket 89, which is secured to the rear side edge of the upper member 70, as best illustrated in FIG. 8.

To lock the housings 1 and 2 with respect to the floor, a brake mechanism can be employed. A beam 90 interconnects the lower ends of housings 1 and 2 and, as shown in FIG. 3, a foot actuated brake 91 can be incorporated with the connecting beam 90. By depressing the brake 91, the brake will contact the floor to prevent movement of the housing in a direction toward and away from the bed 4.

OPERATION

The electrical controls for operating the apparatus of the invention are preferably located at the top of one of the housings 1 and 2 and indicated generally by 92. As the housings 1 and 2 are spaced apart, the operator can conveniently stand between the two housings and operate the controls, as well as providing maximum assistance for the patient.

When the patient requests aid for a bowel movement, the operator initially actuates the controls to operate motor 9 to move the platform, which is a horizontal condition, to a location above the bed. Cylinders 21 are then operated to lower the platform onto the bed next to the patient.

The patient then is rolled onto the platform, either through his own efforts, or with assistance, and with the patient positioned on the horizontal platform, cylinders 21 are then operated to raise the platform above the level of the bed and motor 9 is then actuated to move the platform 3 and housings 1 and 2 laterally of the bed to a location where the platform is located adjacent the bed.

Cylinder 26 is then operated to elevate the back section 41 and motor 78 is operated to lower the leg section 42. The operator will then manually lower the intermediate member 71 of the leg section by releasing the spring clips 85 and pivot the footrest 72 outwardly where it is in proper location for the height of the patient.

After the bowel movement has been completed, the tray 51 is slid outwardly and bag 54 is removed from the tray by disengaging clamping band 56 and a new bag can then be installed. The use of a clear plastic bag enables the attendant to readily determine whether the patient has had a bowel movement.

After the bowel movement has been completed, the procedure is reversed and the patient is returned to the bed 4.

The apparatus of the invention enables the patient to be conveyed from the bed to the toilet without out significant physical exertion, either on the part of the patient or the attendant.

As the toilet seat 49 and containment bag 54 are built into the platform, soilage of the bed clothing is prevented in cases where the patient may be incontinent in transit.

By design of the foot rest the patient is able to place his feet squarely on the footrest with the knees bent to about 120°, which is the normal physiological position for bowel movement.

The invention is a compact unit and can either be operated by an attendant in a situation where a patient has limited movement, or alternately, the controls can be actuated by the patient himself, without assistance, in situations where the patient has limited movement.

The apparatus is reversible, in that it can be used on either side of a bed, and is portable, being movable, if desired, from room to room.

The apparatus also includes safety features which will prevent the patient from falling from the platform or being pinched by any movable components during the operation of the mechanism. In this regard, both the back section 41 and leg section 42 are provided with flip-up side supports 63 which prevent lateral movement of the patient's back and legs respectively. In addition, the supports 81 on the leg section provide assistance for the positioning of the feet on the foot rest and prevent excursions of the feet from the platform. Moreover, potential pinch points between the pivoting sections are protected by gasket material.

As a further safety feature, possible tipping of the structure is prevented by use of the outriggers which can be moved outwardly to a position beneath the platform.

Various modes of carrying out the invention are contemplated as being within the scope of the following claims particularly pointing out and distinctly claiming the subject matter which is regarded as the invention.

I claim:

1. A bedside toilet construction, comprising an elongated platform to support a patient and including a back section, a posterior section and leg section, a toilet associated with said posterior section, said sections being hingedly connected for movement between a generally horizontal position and an operative position wherein said posterior section is disposed generally horizontally and said back section extends upwardly from said posterior section and said leg section extends downwardly from said posterior section, a supporting structure comprising a pair of spaced housings disposed to rest on a foundation, cantilevered support means for supporting said platform in cantilevered relation from said housing, first drive means for moving said platform laterally to position said platform over a bed containing a patient, and second drive means for moving said sections between said horizontal and operative positions.

2. The construction of claim 1, wherein said cantilevered support means comprises an arm extending outwardly from each housing and connected to said platform, said construction also including third drive means for raising and lowering said platform, said second drive means being associated with a first of said housings and said third drive means being associated with a second of said housings.

3. The construction of claim 1, and including outrigger means associated with at least one of said housings and disposed to engage said foundation, said outrigger means being movable between a retracted position and an extended position located beneath said platform.

4. The construction of claim 3, wherein said outrigger means comprises a pair of beams, each beam being slidably mounted with respect to one of said housings and movable between said retracted position and said extended position.

5. The construction of the claim 4, an d including means for mounting the tray for sliding movement beneath said posterior section.

6. The construction of claim 5, wherein said receptacle comprises a plastic bag, and means for removably connecting said bag to said seat.

7. THe construction of claim 1, wherein said first drive means comprises means for moving said housings in unison in a direction lateral to the elongated platform.

8. A bedside toilet construction, comprising an elongated platform to support a patient and including a back section, a posterior section, and leg section, said sections being hingedly connected for movement between a generally horizontal position and an operative position wherein said posterior section is disposed generally horizontally and said back section extends upwardly from said posterior section and said leg section extends downwardly from said posterior section, a pair of spaced housings disposed adjacent said platform and disposed to be supported on a foundation, cantilevered support means extending outwardly from each housing for supporting said platform, a toilet mounted on said posterior section, first drive means for moving said housing sections in a lateral direction with respect to said elongated platform, second drive means for raising and lowering said platform, and third drive means for moving said sections between said horizontal and operative positions.

9. The construction of claim 8, wherein the angle between the posterior section and the leg section when the platform is in the operative position is approximately 50° to 60°.

10. The construction of claim 8, wherein said first drive means is associated with a first of said housings, and said construction includes connecting means interconnecting said housings, operation of said first drive means acting to move said housings in unison.

11. The construction of claim 8, and including outrigger means operatively connected to each housing and located adjacent said foundation, each outrigger means being movable from a retracted position beneath the respective housing to an extended position beneath said platform.

12. The construction of claim 11, wherein said outrigger means includes a pair of beams, each mounted for sliding movement with respect to one of said housings.

13. The construction of claim 8, wherein said third drive means comprises a shaft mounted for rotation with respect to one of said housings, means for rotating the shaft, and means for connecting said shaft to said back section whereby rotation of said shaft will pivot said back section relative to said posterior section.

14. The construction of claim 13, wherein said means for rotating said shaft comprises a fluid cylinder.

15. The construction of claim 8, wherein said back section comprises a longitudinal side rail disposed along one side of said back section and connected to said support means, said back section including a patient support member having guide elements slidably received in said rail.

16. The construction of claim 8, wherein said toilet comprises a seat mounted on said posterior section, a tray removably mounted with respect to said posterior section and located beneath said seat, and a disposable receptacle carried by said tray and located in alignment with said seat.

17. The construction of claim 8, and including brake means connected to at least one of said housings to lock the housing against movement relative to the foundation.

18. The construction of claim 8, and including connecting means interconnecting the lower ends of the spaced housings, and brake means associated with said connecting means for locking said housings against movement relative to the foundation.

19. The construction of claim 8, wherein said second drive means comprises a pair of fluid cylinders, each cylinder mounted within one of said housings and said cylinders connected to the respective cantilevered support means.

20. A bedside toilet construction, comprising an elongated platform to support a patient and including a back section, a posterior section and leg section, a toilet associated with said posterior section, said sections being hingedly connected for movement between a generally horizontal position and an operative position wherein said posterior section is disposed generally horizontally and said back section extends upwardly from said posterior section and said leg section extends downwardly from said posterior section, a supporting structure, cantilevered support means for supporting said platform in cantilevered relation from said supporting structure, first drive means for moving said platform laterally to position said platform over a bed containing a patient, and second drive means for moving said sections between said horizontal and operative positions, said toilet comprising a seat mounted on said posterior section, a tray located beneath the seat and removably mounted with respect to said posterior section, and a receptacle carried by the tray and disposed in alignment with said seat.

21. A bedside toilet construction, comprising an elongated platform to support a patient and including a back section, a posterior section and leg section, a toilet associated with said posterior section, said sections being hingedly connected for movement between a generally horizontal position and an operative position wherein said posterior section is disposed generally horizontally and said back section extends upwardly from said posterior section and said leg section extends downwardly from said positive section, a supporting structure, cantilevered support means for supporting said platform in cantilevered relation from said supporting structure, first drive means for moving said platform laterally to position said platform over a bed containing a patient, and second drive means for moving said sections between said horizontal and operative positions, said first drive means comprising means for moving said supporting structure.

* * * * *

UNITED STATES PATENT AND TRADEMARK OFFICE
CERTIFICATE OF CORRECTION

PATENT NO. : 4,920,587

DATED : May 1, 1990

INVENTOR(S) : HARRY D. KERR

It is certified that error appears in the above-identified patent and that said Letters Patent is hereby corrected as shown below:

Col. 8, Lines 27, CLAIM 8, After "and" insert --a--; Col. 10, Line 25, CLAIM 21, Delete "positive" and substitute therefor --posterior--

Signed and Sealed this

Twenty-fourth Day of December, 1991

Attest:

HARRY F. MANBECK, JR.

Attesting Officer

Commissioner of Patents and Trademarks